United States Patent [19]
Sandstrom et al.

[11] Patent Number: 5,981,633
[45] Date of Patent: Nov. 9, 1999

[54] SILICA REINFORCED RUBBER COMPOSITION AND USE IN TIRES

[75] Inventors: Paul Harry Sandstrom, Tallmadge; Roger John Hopper, Akron; Joseph Andrew Kuczkowski, Munroe Falls, all of Ohio

[73] Assignee: The Goodyear Tire & Rubber Company, Akron, Ohio

[21] Appl. No.: 08/885,782

[22] Filed: Jun. 30, 1997

Related U.S. Application Data

[63] Continuation of application No. 08/378,220, Jan. 25, 1995, abandoned.
[51] Int. Cl.$^6$ ....................................... B60C 11/00
[52] U.S. Cl. ................................ 524/80; 524/2; 524/261; 524/262; 524/495; 152/209 RR; 152/209 PC; 152/450; 152/451
[58] Field of Search ..................................... 524/262, 495, 524/2, 80, 261; 526/295, 338; 152/209 RR, 209 PC, 450, 451

[56] References Cited

U.S. PATENT DOCUMENTS

| | | | |
|---|---|---|---|
| 3,884,285 | 5/1975 | Russell et al. | 526/251 |
| 4,002,594 | 1/1977 | Fetterman | 526/338 |
| 4,022,828 | 5/1977 | Arnold et al. | 524/262 |
| 5,328,949 | 7/1994 | Sandstrom et al. | 524/262 |

*Primary Examiner*—Johann Richter
*Assistant Examiner*—Patrick R. Delaney
*Attorney, Agent, or Firm*—Henry C Young Jr

[57] ABSTRACT

The present invention relates to a rubber composition containing silica reinforcement and pneumatic tires having treads comprised of such rubber composition. The rubber composition comprises an elastomer, silica, optionally carbon black, and a silica coupler comprised of an N,N'-diorgano-N,N'-dithiobis (organosulfonamide).

4 Claims, No Drawings

SILICA REINFORCED RUBBER COMPOSITION AND USE IN TIRES

This is a Continuation of application Ser. No. 08/378,220, filed on Jan. 25, 1995, now abandoned.

FIELD

This invention relates to rubber compositions which contain silica reinforcement and to tires having treads thereof. In one aspect, the rubber composition is comprised of rubber, particularly sulfur cured rubber, reinforced with a combination of silica, optionally carbon black, and a sulfonamide. The silica reinforced rubber composition is contemplated for use in a tread of a pneumatic tire.

BACKGROUND

For various applications utilizing rubber which require high strength and abrasion resistance, particularly applications such as tires and various industrial products, sulfur cured rubber is utilized which contains substantial amounts of reinforcing fillers. Carbon black is commonly used for such purpose and normally provides or enhances good physical properties for the sulfur cured rubber. Particulate silica is also often used for such purpose, particularly when the silica is used in conjunction with a coupling agent. In some cases, a combination of silica and carbon black is utilized for reinforcing fillers for various rubber products, including treads for tires.

It is important to appreciate that, conventionally, carbon black is a considerably more effective reinforcing filler for rubber products, and particularly for rubber tire treads than silica if the silica is used without a coupling agent, or silica coupler as it may be sometimes referred to herein.

Such coupling agents may, for example, be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are sometimes composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

Numerous coupling agents are taught for use in combining silica and rubber, such as, for example, silane coupling agents containing a polysulfide component, or structure, such as bis-(3-triethoxysilylpropyl) tetrasulfide and/or polyisoprene rubber together with a mixture of silica and carbon black, with silica being required to be a major component of the silica/carbon black reinforcing filler.

U.S. Pat. No. 4,513,123 discloses a rubber composition dithiodipropionic acid with natural rubber, or blends of natural and synthetic rubbers, 30–80 parts carbon black, sulfur and organo-cobalt compound for use as skim stock for brass-plated steel. It relates that the rubber composition can contain other additives such as fillers such as clays, silicas or calcium carbonate, process and extender oils, antioxidants, cure accelerators, cure activators, cure stabilizers and the like.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to rubber which has been blended or mixed with various ingredients and materials and such terms are well known to those having skill in the rubber mixing or rubber compounding art.

A reference to an elastomer's Tg refers to a glass transition temperature which can conveniently be determined by a differential scanning calorimeter at a heating rate of 10° C. per minute.

SUMMARY AND PRACTICE OF THE INVENTION

In accordance with one aspect of this invention, a rubber composition is provided which comprises (A) 100 parts by weight of at least one diene-based elastomer, (B) about 5 to about 100, preferably about 25 to about 90, phr of filler composed of particulate, precipitated silica and carbon black, wherein said filler is composed of about 10 to about 85, alternatively about 10 to about 20, and further alternatively about 50 to about 85, phr of said silica, and (C) a modifier selected from (i) N,N'-diorgano-N,N'-dithiobis (organosulfonamide) of the formula

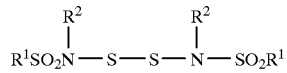

or (ii) a combination of about 95 to about 25, preferably about 95 to about 55, weight percent of said sulfonamide and, correspondingly, about 5 to about 75, preferably about 5 to about 45, weight percent of at least one of dithiodipropionic acid and bis-(3-triethoxysilylpropyl) tetrasulfide; wherein the weight ratio of said modifier to silica is in a range of about 0.01/1 to about 0.2/1; wherein, for the said sulfonamide, $R^1$ and $R^2$ individually represent alkyl radicals having 1 to 20, preferably 1 to 12, carbon atoms, aralkyl radicals having 7 to 20, preferably 7 to 10 carbon atoms, alkaryl radicals having 7 to 20, preferably 7 to 10 carbon atoms, phenyl radicals, and halophenyl radicals where the halogens thereof are selected from chlorine and bromine, preferably chlorine.

In another aspect of the invention, a tire is provided having a tread comprised of the said rubber composition.

Where it is desired for the rubber composition, which contains both silica and carbon black reinforcing pigments, to be primarily reinforced with silica as the reinforcing pigment, it is preferable that the weight ratio of silica to carbon black is at least 3/1 and preferably at least 10/1 and, thus, for example, in a range of about 3/1 to about 30/1.

In the practice of this invention, the modifier, or silica coupler, can be composed of a combination of said sulfonamide and dithiodipropionic acid. While dithiodipropionic acid exists in isomer forms, such as the 3,3'- and 2,2'-forms, the 3,3'-dithiodipropionic acid form is preferred.

In a further practice of the invention, the said modifier can be composed of a combination of the said sulfonamide and bis-(3-triethoxysilylpropyl) tetrasulfide.

In a still further practice of the invention, the said modifier can be composed of a combination of the said sulfonamide, dithiodipropionic acid and bis-(3-triethoxysilylpropyl) tetrasulfide.

For the said sulfonamide, preferably the $R^2$ radicals are alkyl radicals and the $R^1$ radicals are selected from alkaryl, phenyl and haloaryl radicals.

Thus, in one aspect of the invention, the $R^1$ and $R^2$ radicals are mutually exclusive.

Representative examples of preferable alkyl radicals are methyl, ethyl, n-propyl and n-decyl radicals.

Representative examples of aralkyl radicals are benzyl and alpha dimethylbenzyl radicals.

Representative examples of preferable alkaryl radicals are p-tolyl and p-nonylphenyl radicals.

A representative example of a preferable haloaryl radical is a p-chlorophenyl radical.

Representative examples of preferable sulfonamides are N,N'-dimethyl-N,N-dithiobis(benzene-sulfonamide) and N,N'-dimethyl-N,N-dithiobis(p-toluene-sulfonamide), with the benzene-sulfonamide being more preferable.

Such sulfonamides can be suitably prepared, for example, by reacting a sulfonamide with sulfur monochloride and caustic in a mixed organic-aqueous media. Such a synthesis is described in U.S. Pat. No. 4,877,901. U.S. Pat. No. 4,877,901 is specifically incorporated herein by reference.

The said sulfonamide is considered herein to be particularly advantageous for the practice of this invention because it is considered to assist in enabling the silica to reinforce the sulfur vulcanizable elastomer(s) in the rubber composition.

In one aspect, such a rubber composition can be provided as being sulfur cured. The sulfur curing is accomplished in a conventional manner, namely, by curing under conditions of elevated temperature and pressure for a suitable period of time.

In the practice of this invention, as hereinbefore pointed out, the rubber composition is comprised of at least one diene-based elastomer, or rubber. Thus, it is considered that the elastomer is a sulfur curable elastomer. Such diene based elastomer, or rubber, may be selected, for example, from at least one of cis 1,4-polyisoprene rubber (natural and/or synthetic, and preferably natural rubber) and, for example, synthetic polymers and copolymers of isoprene and butadiene and, for example, copolymers of nonconjugated dienes with aromatic vinyl compounds such as styrene and alpha methylstyrene. Representative of such elastomers are, for example, cis 1,4-polyisoprene, cis 1,4-polybutadiene, medium vinyl polybutadiene containing about 35 to about 55 percent vinyl units, 3,4-polyisoprene, isoprene/butadiene copolymers, styrene/butadiene copolymers, styrene/isoprene copolymers, butadiene acrylonitrile copolymers, styrene/butadiene/acrylonitrile terpolymers and styrene/isoprene/butadiene terpolymers. It is appreciated that the styrene/butadiene elastomers may be organic solution or aqueous emulsion polymerization prepared.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR might be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile terpolymer rubbers containing about 2 to about 40 weight percent bound acrylonitrile in the terpolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-polyisoprene elastomer and use thereof is more fully described in U.S. Pat. No. 5,087,668 which is incorporated herein by reference.

The cis 1,4-polybutadiene rubber is considered to be beneficial for a purpose of enhancing the tire tread's wear, or treadwear.

Such polybutadiene elastomer can be prepared, for example, by organic solution polymerization of 1,3-butadiene as is well known to those having skill in such art.

The polybutadiene elastomer may be conveniently characterized, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of silica, and carbon black if used, reinforcing filler(s) to contribute a reasonably high modulus and high resistance to tear. The combined weight of the silica and carbon black, as hereinbefore referenced, may be as low as about 30 parts per 100 parts rubber, but is more preferably from about 35 to about 90 parts by weight.

While it is considered herein that commonly employed siliceous pigments used in rubber compounding applications might be used as the silica in this invention, including pyrogenic and precipitated siliceous pigments (silica), precipitated silicas are preferred.

The siliceous pigments, preferably employed in this invention, are precipitated silicas such as, for example, those obtained by the acidification of a soluble silicate, e.g., sodium silicate. Such precipitated silicas are well known to those having skill in such art.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc such as, for example, Zeosil 1165MP and silicas available from Degussa AG with, for example, designations VN2 and VN3, etc.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with sulfonamide as a coupling agent.

The presence and relative amounts of the above additives are not considered to be an aspect of the present invention which is more primarily directed to the utilization of specified blends of rubbers in rubber compositions, in combination with silica and the said sulfonamide either alone or in combination with dithiodipropionic acid, bis-(3-triethoxysilylpropyl) tetrasulfide or with a combination of dithiodipropionic acid and bis-(3-triethoxysilylpropyl) tetrasulfide as well as, optionally, carbon black, for the reinforcement of the rubber.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica and silica coupler, and carbon black if used, are mixed in one or more non-productive mix stages. The terms "non-productive" and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

N,N'-dimethyl-N,N'-dithiobis (benzenesulfonamide) was prepared according to Example II contained within U.S. Pat. No. 4,877,901.

EXAMPLE II

In this example, N,N'-dimethyl-N,N'-dithiobis (benzenesulfonamide), according to Example I herein, was evaluated as an alternative for a relatively commonly used silica coupling agent, bis-(3-triethoxysilylpropyl) tetrasulfide, in a silica reinforced rubber composition. Rubber compositions containing the materials set out in Table 1 were prepared in a BR Banbury mixer using three separate stages of addition (mixing), namely, two non-productive mix stages and one productive mix stage to temperatures of 160° C., 160° C. and 120° C. and times of 4 minutes, 4 minutes and 2 minutes, respectively. The amount of coupler is listed as being "variable" in Table 1 and is more specifically set forth in Table 2.

It is clearly evident that a coupling agent, or other modifier, is required to obtain suitable cured properties in a silica containing rubber compound. Such properties include tensile strength at break, the 100 and 300% modulus values, rebound, hardness, Rheovibron E' and particularly DIN abrasion resistance (lower values better for abrasion). Samples 2 and 3, when compared to Sample 1, which was prepared in the absence of coupling agent, clearly show the advantage of the coupling agents. The properties of Sample 3, which contains the material of this invention approaches the values of Sample 2 which contains the conventional silane coupling agent.

TABLE 1

| 1st Non-Productive | |
|---|---|
| NAT2200[1] | 100.00 |
| Carbon Black | 35.00 |
| Processing oil | 5.00 |
| Zinc Oxide | 5.00 |
| Fatty Acid | 2.00 |
| Antioxidant[2] | 2.00 |
| 2nd Non-Productive | |
| Silica[3] | 15.00 |
| Bis-(3-triethoxysilylpropyl) tetrasulfide[4] | variable |
| N,N'-dimethyl-N,N'-dithiobis (benzenesulfonamide) | variable |
| Productive | |
| Sulfur | 1.40 |
| Accelerator, sulfenamide type | 1.00 |

[1]synthetic cis 1,4-polyisoprene from The Goodyear Tire & Rubber Company;
[2]polymerized 1,2-dihydro-2,2,4-trimethylquinoline type;
[3]Hi-Sil-210 from PPG Industries, Inc.;
[4]A composite commercially available from Degussa GmbH as X505 in a form of a 50/50 blend of bis-(3-triethoxysilylpropyl) tetrasulfide (said tetrasulfide also available from Degussa GmbH as Si69), with carbon black and, thus, the tetrasulfide is considered as being 50% of the composite.

TABLE 2

| Sample # | 1 | 2 | 3 |
|---|---|---|---|
| Si69 (50% active) | 0 | 3 | 0 |
| Benzenesulfonamide of Table 1 | 0 | 0 | 2 |
| Rheometer (150° C.) | | | |
| Max. Torque | 28.8 | 33.4 | 33.0 |
| Min. Torque | 8 | 7.4 | 7.5 |
| Delta Torque | 20.8 | 26.0 | 25.5 |
| T$_{90}$, minutes | 21.0 | 18.5 | 27.3 |
| Stress - Strain | | | |
| Tensile Strength, MPa | 17.2 | 20.3 | 19.7 |
| Elongation at Break, % | 655 | 589 | 603 |
| 100% Modulus, MPa | 1.12 | 1.81 | 1.54 |
| 300% Modulus, MPa | 4.91 | 8.65 | 7.23 |
| Rebound | | | |
| 100° C., % | 56.7 | 61.8 | 63.5 |
| Hardness | | | |

TABLE 2-continued

| Sample # | 1 | 2 | 3 |
|---|---|---|---|
| Shore A, 100° C. | 45.6 | 53.2 | 52.6 |
| Rheovibron | | | |
| E' at 60° C., MPa | 8.9 | 12.7 | 12.0 |
| Tan Delta at 60° C. | .109 | .099 | .096 |
| DIN Abrasion | 252 | 168 | 178 |

In particular, this Example shows that the benzene sulfonamide, as utilized in Sample #3, can provide significant improvements in modulus, rebound, hardness and abrasion when compared to control Sample #1 which does not contain coupling agent. Furthermore, these properties are comparable to those of Sample #2 which contains the conventional silane coupling agent.

EXAMPLE III

In this example, the benzenesulfonamide of Example I herein, was evaluated as a partial or total replacement for the bis-(3-triethoxysilylpropyl) tetrasulfide in a highly silica loaded rubber composition. Rubber compositions containing the materials set out in Table 3 were prepared in a BR Banbury mixer using two separate stages of addition (mixing), namely, a non-productive mix and a productive mix stage to temperatures of 160° C. and 120° C. and times of approximately 8 minutes and 2 minutes, respectively. The variations in the recipes are indicated in Table 4 along with the cure behavior and cured properties.

Again, it is evident that a coupling agent is required in a silica containing rubber compound to achieve optimum cured properties. The sulfonamide alone gave some improvement in properties (Sample 7), whereas the combination of sulfonamide and Si69 (Sample 6) gave properties somewhat similar to those of Sample 5 which contained only the Si69 coupling agent.

TABLE 3

| Non-Productive | |
|---|---|
| Natural Rubber | 10.00 |
| *Cis 1,4-polybutadiene Rubber | 20.00 |
| Isoprene/Butadiene Copolymer (50/50) | 45.00 |
| Emulsion SBR (40% Styrene) | 34.38 |
| Wax | 1.50 |
| Si69 (50% Active) | variable |
| Zinc Oxide | 2.5 |
| Antioxidant | 2 |
| Sulfonamide of Table 1 | variable |
| Silica, Zeosil 1165MP | 80.00 |
| Productive | |
| Sulfur | variable |
| Accelerators | variable |
| Antioxidant | 1.0 |
| Processing Aid | variable |

*From The Goodyear Tire & Rubber Company

TABLE 4

| Sample # | 4 | 5 | 6 | 7 |
|---|---|---|---|---|
| Si69 (50% active) | 0 | 12.8 | 6.0 | 0 |
| Sulfonamide of Table 1 | 0 | 0 | 4.0 | 5.0 |

TABLE 4-continued

| Sample # | 4 | 5 | 6 | 7 |
|---|---|---|---|---|
| Sulfenamide Accelerator | 1.7 | 1.7 | 3.0 | 1.7 |
| Sulfur | 1.4 | 1.4 | 3.5 | 2.8 |
| Processing Aid* | 0 | 0 | 10 | 10 |
| Rheometer (150° C.) | | | | |
| Max. Torque | 60.0 | 43.5 | 37.2 | 65.2 |
| Min. Torque | 38.0 | 12.2 | 7.0 | 24.2 |
| Delta Torque | 22.0 | 31.3 | 30.2 | 41.0 |
| T$_{90}$, minutes | 34.5 | 17.0 | | 17.3 |
| Stress-Strain | | | | |
| Tensile Strength, MPa | 11.5 | 15.6 | 11.9 | 9.5 |
| Elongation at Break, % | 1020 | 398 | 338 | 579 |
| 100% Modulus, MPa | 1.1 | 2.5 | 3.1 | 1.8 |
| 300% Modulus, MPa | 2.2 | 12.1 | 11.4 | 4.0 |
| Rebound | | | | |
| 100° C., % | 48 | 63 | 70 | 58 |
| Hardness | | | | |
| Shore A, 100° C. | 62 | 62 | 62 | 65 |

*Struktol A6

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber tread of a rubber composition comprised of (A) 100 parts by weight of at least one diene-based elastomer, (B) about 5 to about 100 phr of filler composed of particulate, precipitated silica and carbon black, wherein said filler is composed of about 10 to about 85 phr of said silica, and (C) a silica coupler consisting of (i) N,N'-dimethyl-N,N'-dithiobis (benzenesulfonamide) or (ii) a combination of about 95 to about 25 weight percent of said sulfonamide and, correspondingly, about 5 to about 75 weight percent of bis-(3-triethoxysilylpropyl) tetrasulfide; wherein the weight ratio of said coupler to silica is in a range of about 0.01/1 to about 0.2/1.

2. The tire of claim 1 wherein the diene-based elastomer is selected from at least one of cis 1,4-polyisoprene rubber, 3,4-polyisoprene rubber, styrene/butadiene copolymer rubber, styrene/isoprene/butadiene terpolymer rubbers, cis 1,4-polybutadiene rubber, and emulsion polymerization prepared styrene/butadiene/acrylonitrile terpolymer rubber and butadiene/acrylonitrile copolymer rubber.

3. A pneumatic tire of claim 1 wherein the said filler of said rubber tread composition contains about 10 to about 20 phr of silica.

4. A pneumatic tire of claim 1 wherein the said filler of said rubber tread composition contains about 50 to about 85 phr of silica.

* * * * *